Feb. 20, 1945.　　C. W. J. HEDBERG ET AL　　2,369,967
MATERIAL COLLECTING ELECTRODE
Filed Sept. 11, 1943　　5 Sheets-Sheet 1
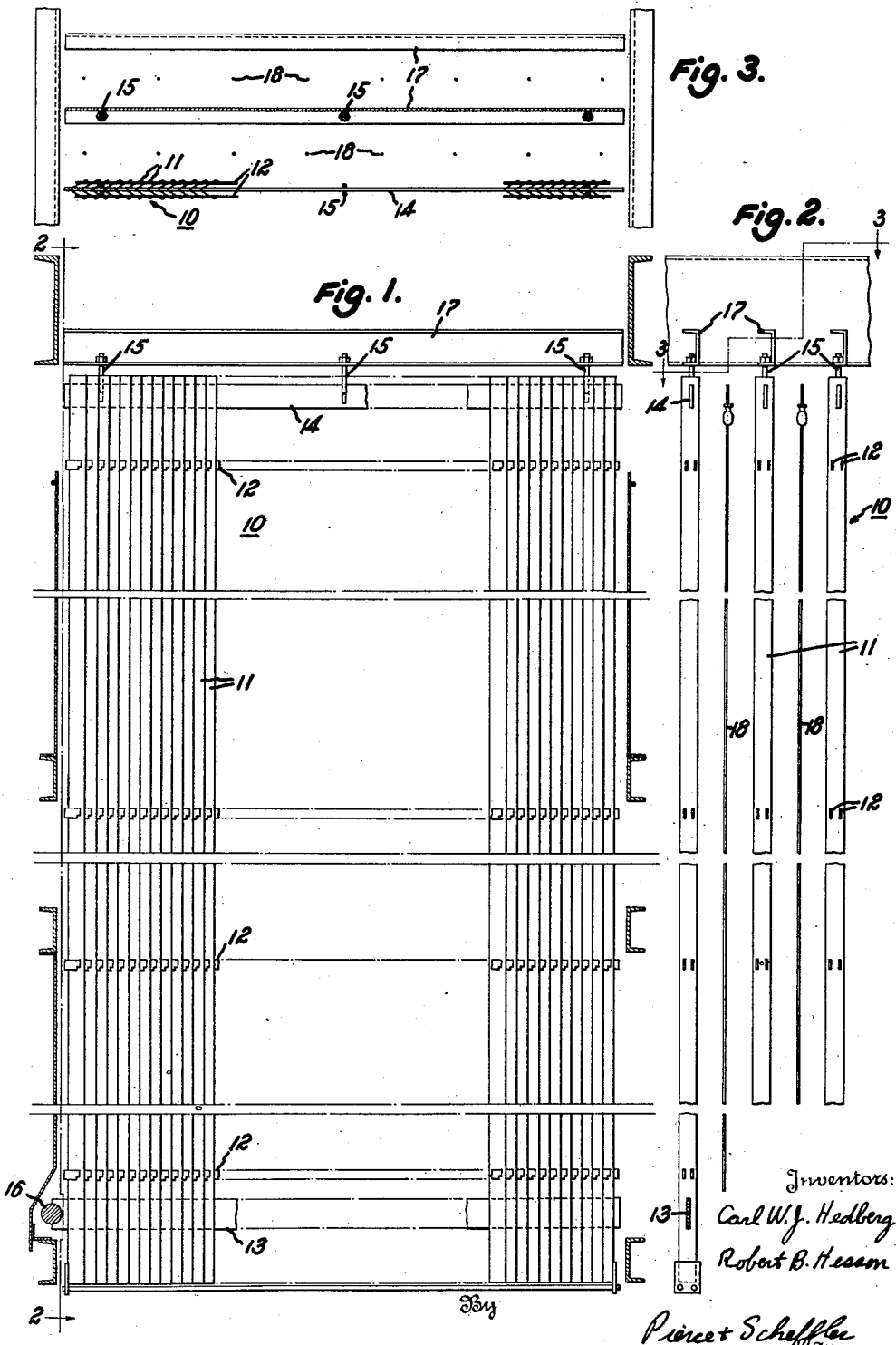

Feb. 20, 1945. C. W. J. HEDBERG ET AL 2,369,967
MATERIAL COLLECTING ELECTRODE
Filed Sept. 11, 1943 5 Sheets-Sheet 2
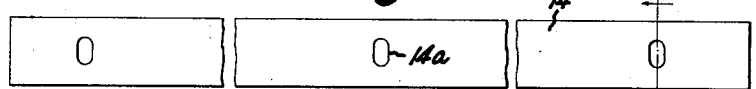
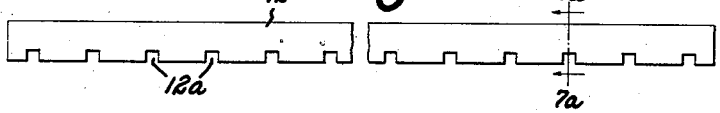
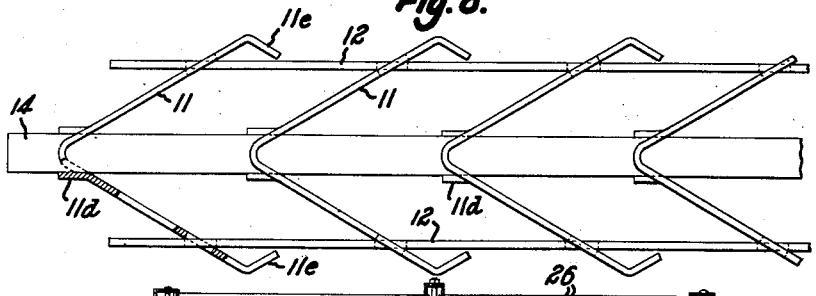
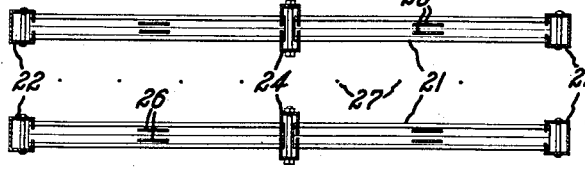
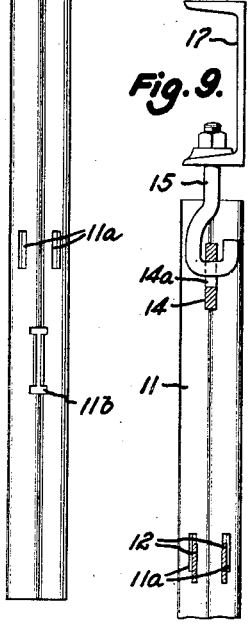
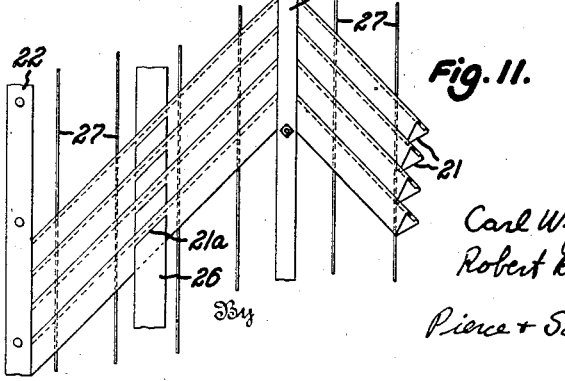

Feb. 20, 1945. C. W. J. HEDBERG ET AL 2,369,967
MATERIAL COLLECTING ELECTRODE
Filed Sept. 11, 1943 5 Sheets-Sheet 3
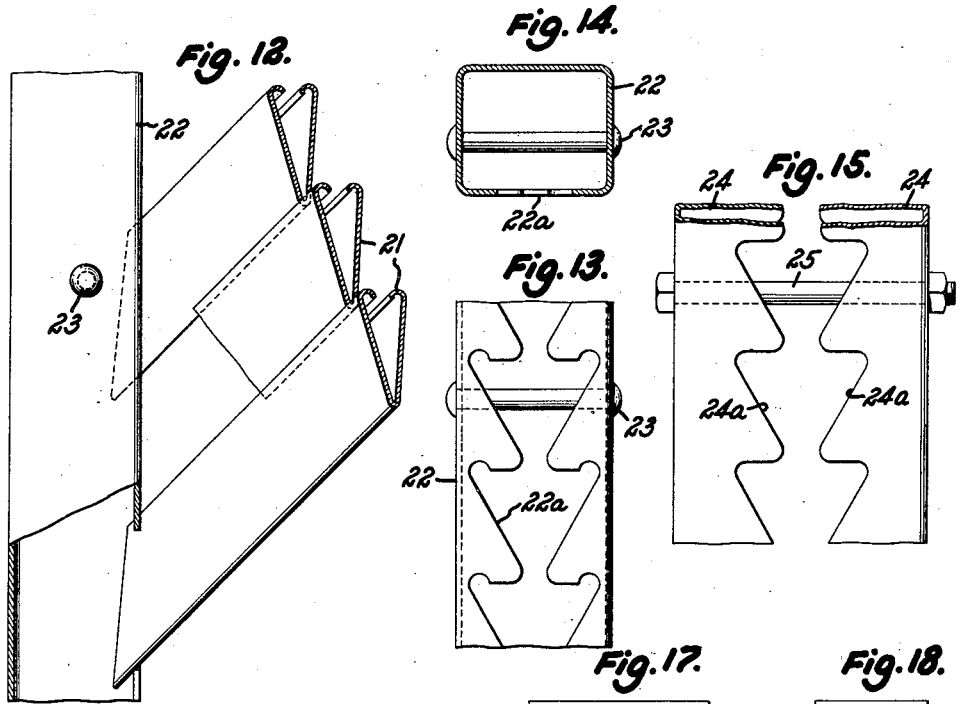
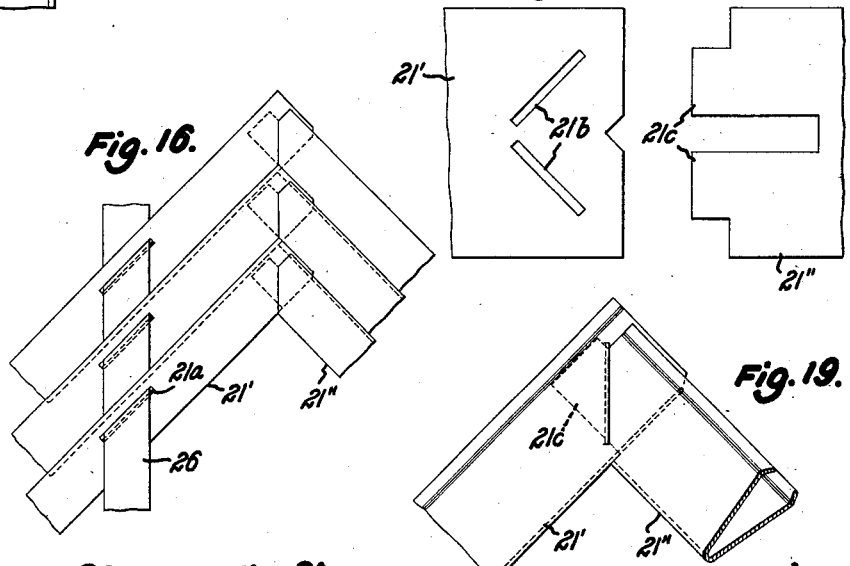

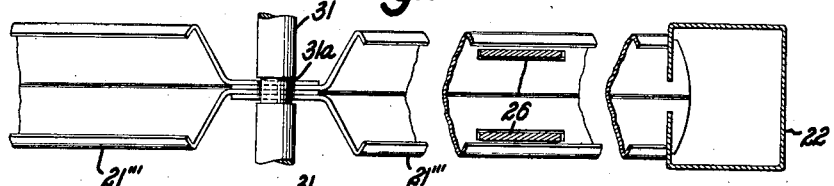
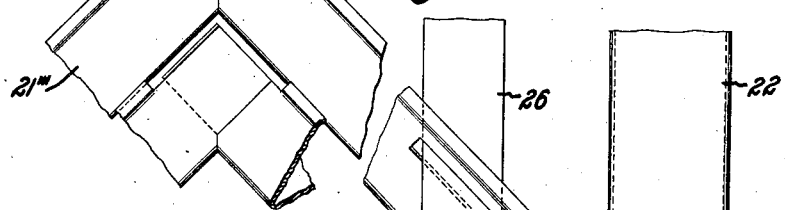
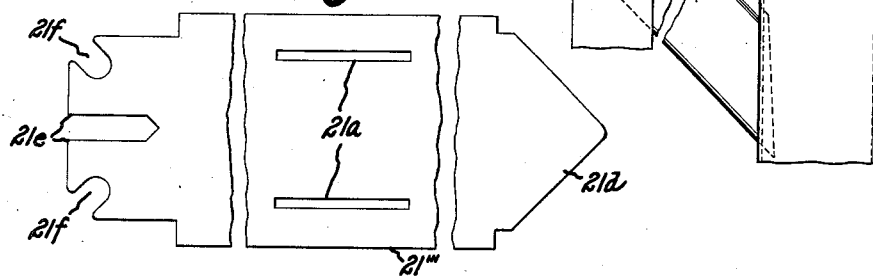
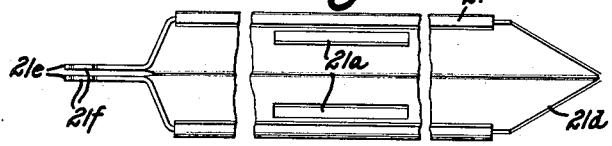
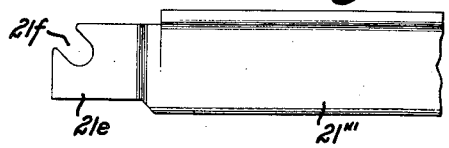
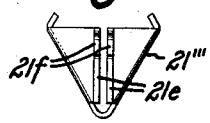

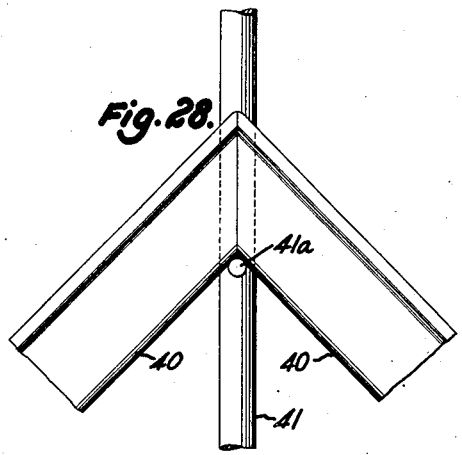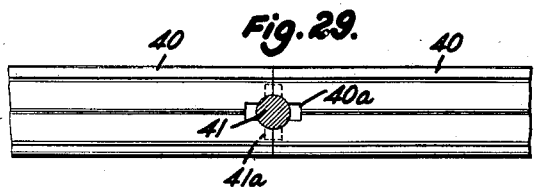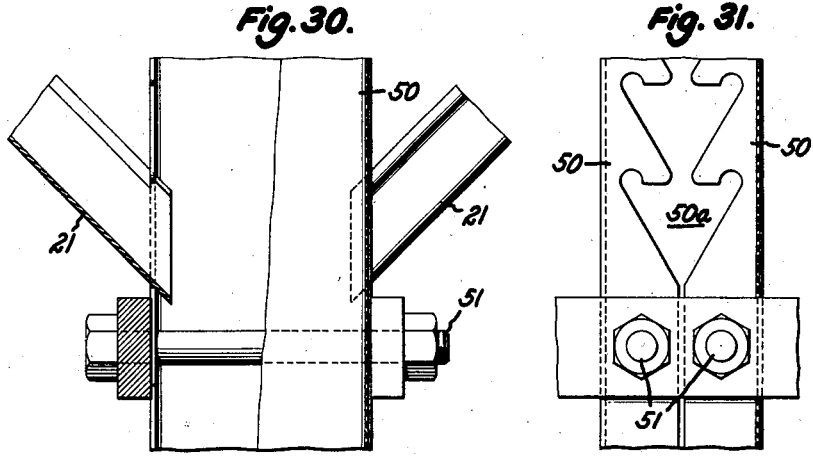

Patented Feb. 20, 1945

2,369,967

UNITED STATES PATENT OFFICE 2,369,967

MATERIAL COLLECTING ELECTRODE

Carl W. J. Hedberg and Robert B. Hesson, Bound Brook, N. J., assignors to Research Corporation, New York, N. Y., a corporation of New York Application September 11, 1943, Serial No. 502,010

14 Claims. (Cl. 183—7)

This invention relates to electrical precipitation and is particularly directed to novel collecting electrode structures for electrical precipitators of the Cottrell type.

A principal purpose of the invention is the provision of a strong, light-weight collecting electrode particularly useful for large size electrical precipitators.

A further object of the invention is the provision of a demountable collecting electrode construction.

Another object of the invention is to provide a collecting electrode of high material collecting efficiency which will occupy a minimum of space in the precipitator.

The collecting electrode structure of the invention comprises a plurality of parallel V-shaped members extending in generally vertical or diagonal position, maintained in spaced relation by removable members positioned wholly within the lateral faces of the space occupied by the V-shaped members, to form a vertically extending structure having its face portions free from supporting and positioning structural elements. Preferably the V-shaped members are positioned at an angle of from 30° to 90° to the horizontal.

Further features and advantages of the invention will be apparent from the following description of typical embodiments of the invention with reference to the accompanying drawings, in which:

Fig. 1 is a side elevation of a collecting electrode structure embodying the principles of the invention;

Fig. 2 is an end elevation of the collecting electrode structures of Fig. 1 in association with complementary discharge electrodes;

Fig. 3 is a top view of the electrode assembly of Figs. 1 and 2, in partial section on line 3—3 of Fig. 2;

Fig. 4 is an end elevation of an individual electrode plate;

Fig. 5 is a side elevation and Fig. 5a is a section, on line 5a—5a of Fig. 5, of a support bar;

Fig. 6 is a side elevation and Fig. 6a is a section, on line 6a—6a of Fig. 6, of a guide bar;

Fig. 7 is a side elevation and Fig. 7a is a section, on line 7a—7a of Fig. 7, of a spacer bar;

Fig. 8 is a fragmentary view in partial section showing details of the assembly of the electrode plates, spacer bars and guide bars;

Fig. 9 is a fragmentary view in partial section showing details of the supporting means of the electrode structure;

Fig. 10 is a top view and Fig. 11 is a fragmentary side elevation of a modified embodiment of the invention;

Figs. 12 to 15 are fragmentary enlarged details of the electrode structure of Figs. 10 and 11;

Figs. 16 to 21 are fragmentary details of a modification of the electrode structure of Figs. 10 and 11, and Figs. 22 to 31 are fragmentary details of further modifications of the electrode structure of Figs. 1 and 11.

In the embodiment of the invention illustrated in Figs. 1–9 of the drawings, the collecting electrode structure 10 comprises a plurality of parallel, vertically extending V-members 11, maintained in parallel spaced relation by spacer bars 12 and guide bars 13, and supported from suitable structural members by support bars 14. Preferably the V-members are so spaced that the webs of the V's extend to or past the apex of the adjacent V so that the lateral aspect of the electrode assembly presents no rectilinear passages from face to face of the assembly.

The V-members 11, as shown more particularly in Fig. 4, are provided with suitably spaced rectangular slots 11a in the webs of the members for the spacer bars 12, and apically located I-slots 11b for the guide bars 13, and I-slots 11c for the support bars 14. As shown in Figs. 5, 6 and 7, respectively, support bars 14 are provided with spaced holes 14a, to receive suspending hooks 15 (Fig. 9), guide bars 13 are provided at one end with a round notch 13a to engage the hammer member 16 (Fig. 1) of a rapping mechanism not otherwise shown, and spacer bars 12 are provided at their low ends with a plurality of notches 12a adapted to engage the webs of the spaced V-members.

In assembling the electrode structure spacer members 12 are slid through slots 11a of a plurality of V-members 11 and are dropped into a position such that the notches 12a engage the webs of the V-members at the lower edges of the slots 11a thereby maintaining the predetermined spaced parallel position of the V-members. Guide bars 13 are slid through the alined slots 11b of the V-member assembly, and support bars 14 are slid through slots 11c. Before assembly the lateral webs of the I-slots 11b, 11c are bent out to form bearing elements 11d for bearing engagements with bars 13 and 14, as shown in Fig. 8. The edges of the lateral webs of the V-members 11 are also preferably bent inward into engagement with the spacer bars 12, as shown at 11e in Fig. 8. The elements of the collecting electrode assembly may, if desired, be tack welded at occasional contact points in the assembly without substantially interfering with the easy removability of any of the elements or dismantling of the entire assembly for replacement or repairs.

The electrode assembly is supported from suitable structural members of the precipitator structure, such as channel beams 17 by means of hooks 15 engaging holes 14a in support bars 14. In the electrical precipitator discharge electrode members 18 are positioned between the collecting electrode assemblies in the manner well-known in the art for the purpose of maintaining a high tension electric field between the discharge and collecting electrodes. The collecting electrode assemblies are preferably mounted in the precipitator with the apices of the V-members pointing against the flow of gases through the precipitator.

It will be seen that the construction provides a light, simple, readily demountable collecting electrode assembly, having a plurality of sheltered vertical spaces for the collection of suspended material from the gas stream flowing between the electrodes and permitting the collected material to drop into suitable hoppers at the lower ends of the electrodes without danger of redispersion into the gas stream.

The construction further makes possible the maintenance of sufficient rigidity of structure of the electrode assembly to permit the erection of very large electrodes without the use of intricate or heavy devices to insure the structure against bending or swaying out of proper alignment with the other elements of the precipitator.

The principles of the invention are by no means limited to the particular details of construction shown by way of illustrative example in Figs. 1–9, but may be applied, for example, to electrode structures in which V-members are inclined to provide sloping conduits shielded from the gas stream to carry the precipitated material away from the precipitating field and into a suitable material collecting device.

In the construction shown in Figs. 10–15, the lower ends of the parallel inclined V-members 21 are engaged in vertical conduit members 22 having openings 22a in one face thereof adapted to be held in engagement with the V-members by means of bolts 23. The upper ends of the V-members 21 are positioned in notches 24a of clamp members 24 which are held in engagement with the V-members by means of bolts 25. The rigidity of the structure and the proper spacing of the V-members are maintained by means of vertical spacer bars 26 passing through alined slots 21a in the webs of the V-members.

The collecting electrode assembly is mounted in a precipitator structure in the known manner in opposition to discharge electrodes 27, as shown in Figs. 10 and 11.

Figs. 16–21 show a modification of the construction of Figs. 10 and 11 in which the members 24 engaging the upper ends of the V-members are eliminated. In this form of the invention, the upper ends of the V-members 21', 21'' are formed for interlocking engagement with one another. As shown in the fragmentary end view of unbent V-members in Figs. 17 and 18, V-members 21' have a female end provided with angular slots 21b and V-members 21'' have a male end provided with projecting tabs 21c. Male and female ends are interengaged as shown in assembly in Fig. 16, in enlarged detail in Fig. 19, and in plan views of the female and male ends, respectively, in Figs. 20 and 21.

In the modification shown in Figs. 22–27, the V-members 21''' are shaped at their upper ends to engage horizontal support members. The V-member in unbent form is shown in Fig. 24. Its lower end is provided with a triangular tab 21d. Its upper end is provided in projecting tabs 21e having notches 21f in their outer corners. When the members 21''' are bent into V-shape, the tabs 21e are brought together, as shown in top view in Fig. 25, in side view in Fig. 26 and in end view in Fig. 27. In the assembly, as shown in side view in Fig. 22 and in plan view in Fig. 23, the notches 21f engage circumferential grooves 31a in horizontal rods 31. This form of the V-members can be combined in an assembly with forms of the type shown in Figs. 16–21, to provide transverse stiffening between adjacent collecting electrode assemblies by means of the rods 31. Such a combination is indicated in Fig. 22.

In the modification of the invention shown in Figs. 28 and 29, pairs of inclined V-members 40 are welded together at their top ends and are supported and spaced by means of a vertical rod 41 with horizontal pins 41a, passing through holes 40a in the apices of the V-members. Holes 40a have extensions adapted to pass the pins 41a when rods 41 are turned so that the pins extend in the direction longitudinally of the V-members. When the pins are turned transversely of the V-members they engage and support the members as shown.

Figs. 30 and 31 illustrate conduit members 50 having notches 50a adapted to receive the lower ends of adjacent groups of inclined V-members 21 and to provide a common material receiving chute for the material collected in both groups of V-members. The members 50 are maintained in engagement with the V-members by means of bolts 51.

It will be seen that the principles of the invention may be applied to a wide variety of structural arrangements characterized by including a plurality of parallel V-shaped members, preferably positioned at an angle of from 30° to 90° to the horizontal, and maintained in spaced relation, preferably such that the webs of each V-member extend at least to the apex of the next succeeding V-member, by means of positioning members passing through the webs of the V-members.

We claim:

1. A collecting electrode assembly comprising a plurality of parallel V-members, extending at an angle of from about 30° to 90° to the horizontal and maintained in spaced position by members passing through the web of said V-members.

2. A collecting electrode assembly comprising a plurality of parallel V-members, extending at an angle of from about 30° to 90° to the horizontal and maintained in spaced position by members positioned entirely within the lateral faces of the space defined by said V-members.

3. A collecting electrode assembly comprising a plurality of parallel, vertically extending V-members, maintained in spaced relation by horizontal members passing through the web of said V-members.

4. A collecting electrode assembly comprising a plurality of parallel, vertically extending V-members, maintained in spaced relation by horizontal members passing through the web of said V-members and supported by a horizontal member passing through said V-member.

5. A collecting electrode assembly comprising a plurality of parallel V-members, inclined at an angle to the horizontal and maintained in spaced position by vertical members passing through the web of said V-members.

6. In a collecting electrode assembly, a plurality of parallel spaced V-members having alined slots in the web thereof and at least one member extended through said slots and having regularly spaced notches therein to engage the web of said V-members and maintain said V-members in regularly spaced position.

7. In a collecting electrode assembly, a plurality of parallel spaced vertically extending V-members having alined slots in the web thereof and at least one member extending horizontally through said slots and having regularly spaced notches therein to engage the web of said V-members and maintain said V-members in regularly spaced position.

8. In a collecting electrode assembly, at least two groups of inclined parallel spaced V-members, said groups being positioned in the same vertical plane with the upper ends of the V-members adjacent and the adjacent upper ends of said V-members being shaped to interlock for mutual support.

9. In a collecting electrode assembly, at least two groups of inclined parallel spaced V-members, said groups being positioned in the same vertical plane with the upper ends of the V-members adjacent and the adjacent upper ends of said V-members being shaped to engage a common support member.

10. In a collecting electrode assembly, at least two groups of inclined parallel spaced V-members, said groups being positioned in the same vertical plane with the upper ends of the V-members adjacent and the adjacent upper ends of said V-members being shaped to interlock in engagement with a common support member.

11. In a collecting electrode assembly, a plurality of parallel spaced V-members having alined slots in the web thereof adapted to receive a positioning member extending substantially transversely of said V-members.

12. In a collecting electrode assembly, a plurality of parallel spaced V-members having alined slots in the web thereof adapted to receive a supporting member extending substantially transversely of said V-members.

13. In a collecting electrode assembly, a plurality of parallel spaced vertically extending V-members having alined slots in the web thereof adapted to receive a horizontally extending positioning member.

14. In a collecting electrode assembly, a plurality of parallel spaced V-members having alined slots in the web thereof adapted to receive a positioning member extending substantially transversely of said V-members and having tongue portions bent out of the plane of the web into position for bearing engagement with such positioning member.

CARL W. J. HEDBERG.
ROBERT B. HESSON.